United States Patent
Huang et al.

(10) Patent No.: US 7,903,857 B2
(45) Date of Patent: Mar. 8, 2011

(54) ROBUST CLICK-POINT LINKING WITH GEOMETRIC CONFIGURATION CONTEXT: INTERACTIVE LOCALIZED REGISTRATION APPROACH

(75) Inventors: Xiaolei Huang, Bethlehem, PA (US); Arun Krishnan, Exton, PA (US); Kazunori Okada, Los Angeles, CA (US); Xiang Zhou, Exton, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1060 days.

(21) Appl. No.: 11/705,375

(22) Filed: Feb. 12, 2007

(65) Prior Publication Data
US 2007/0242901 A1 Oct. 18, 2007

Related U.S. Application Data

(60) Provisional application No. 60/792,507, filed on Apr. 17, 2006.

(51) Int. Cl.
G06K 9/00 (2006.01)
G06K 9/62 (2006.01)
G06K 9/46 (2006.01)
G06K 9/32 (2006.01)

(52) U.S. Cl. ......... 382/131; 382/159; 382/224; 382/190; 382/294

(58) Field of Classification Search ........................ None
See application file for complete search history.

(56) References Cited

U.S. PATENT DOCUMENTS

| | | | |
|---|---|---|---|
| 6,597,801 B1 * | 7/2003 | Cham et al. ............ | 382/103 |
| 2001/0055016 A1 | 12/2001 | Krishnan | |
| 2004/0133083 A1 | 7/2004 | Comaniciu et al. | |
| 2004/0147840 A1 | 7/2004 | Durrirala et al. | |
| 2004/0193036 A1 | 9/2004 | Zhou et al. | |
| 2004/0223633 A1 | 11/2004 | Krishnan | |
| 2004/0228529 A1 | 11/2004 | Jerebko et al. | |
| 2005/0036710 A1 | 2/2005 | Okada et al. | |
| 2005/0058338 A1 | 3/2005 | Krishnan et al. | |
| 2005/0135663 A1 | 6/2005 | Okada et al. | |
| 2005/0147303 A1 | 7/2005 | Zhou et al. | |
| 2005/0201606 A1 | 9/2005 | Okada et al. | |
| 2005/0251013 A1 | 11/2005 | Krishnan et al. | |

(Continued)

OTHER PUBLICATIONS

Shi et al. (Jun. 1994) "Good features to track." Proc. 1994 IEEE Conf. on Computer Vision and Pattern Recognition, pp. 593-600.*

(Continued)

*Primary Examiner* — Brian P Werner
*Assistant Examiner* — Barry Drennan
(74) *Attorney, Agent, or Firm* — Donald B. Paschburg

(57) ABSTRACT

Disclosed is robust click-point linking, defined as estimating a single point-wise correspondence between data domains given a user-specified point in one domain or as an interactive localized registration of a monomodal data pair. To link visually dissimilar local regions, Geometric Configuration Context (GCC) is introduced. GCC represents the spatial likelihood of the point corresponding to the click-point in the other domain. A set of scale-invariant saliency features are precomputed for both data. GCC is modeled by a Gaussian mixture whose component mean and width are determined as a function of the neighboring saliency features and their correspondences. This allows correspondence of dissimilar parts using only geometrical relations without comparing the local appearances. GCC models are derived for three transformation classes: pure translation, scaling and translation, and similarity transformation. For solving the linking problem, a variable-bandwidth mean shift method is adapted for estimating the maximum likelihood solution of the GCC.

17 Claims, 4 Drawing Sheets

U.S. PATENT DOCUMENTS

| | | |
|---|---|---|
| 2006/0008138 A1 | 1/2006 | Zhou et al. |
| 2006/0050958 A1 | 3/2006 | Okada et al. |
| 2006/0050960 A1 | 3/2006 | Tu et al. |
| 2006/0064007 A1 | 3/2006 | Comaniciu et al. |
| 2006/0074834 A1 | 4/2006 | Dong et al. |
| 2006/0079761 A1 | 4/2006 | Tu et al. |
| 2006/0171586 A1 | 8/2006 | Georgescu et al. |
| 2006/0239552 A1 | 10/2006 | Tu et al. |
| 2006/0269109 A1 | 11/2006 | Okada et al. |

OTHER PUBLICATIONS

Siadat et al. (May 2004) "Bayesian landmark identification in medical images." Proc. SPIE vol. 5370, pp. 628-639.*

Betke et al. (2003) "Landmark detection in the chest and registration of lung surfaces with an application to nodule registration." Medical Image Analysis, vol. 7 pp. 265-281.*

T. Kadir and M. Brady, "Saliency, scale and image description," International Journal of Computer Vision, vol. 45, No. 2, pp. 83-105, 2001.

X. Huang, Y. Sun, D. Metaxas, F. Sauer, and C. Xu, "Hybrid image registration based on configural matching of scale-invariant salient region features, " in Second IEEE Workshop on Image and Video Registration, in conjuction with CVPR '04, 2004.

D. Hahn, Y. Sun, J. Homegger, C. Xu, G. Wolz, and T. Kuwert, "A practical salient region feature based 3D multimodality registration method for medical images." in SPIE Med. Imag., 2006.

D. Comaniciu, "An algorithm for data-driven bandwidth selection," IEEE Trans. Pat. Anal. Mach. Intell, vol. 25, No. 2, pp. 281-288, 2003.

R. Fergus, P. Perona, and A. Zisserman, "Object class recognition by unsupervised scale-invariant learning," in IEEE Conf. on Computer Vision and Pattern Recognition, vol. 2, 2003, pp. 264-271.

B. Epshtein and S. Ullman, "Identifying semantically equivalent object fragments," in IEEE Coni on Computer Vision and Pattern Recognition. vol. 1, 2005, pp. 2-9.

X. Pennec, N. Ayache, and J. Thirion, "Landmark-based registration using features identified through differential geometry," in Handbook of Medical Imaging, Academic Press, 2000, pp. 499-513.

K. Okada, D. Cornaniciu, and A. Krishnan, "Robust anisotropic Gaussian fitting for volumetric characterization of pulmonary nodules in multislice CT," IEEE Trans. Med. Imag., vol. 24, No. 3, pp. 409-423, 2005.

C. Novak, H. Shen, B. Odry, J. Ko, and D. Naidich, "System for automatic detection of lung nodules exhibiting growth," in SPIE Med. Imag., 2004.

P. J. Besl and N. D. McKay, "A method for registration of 3-d shapes," IEEE Trans. Pattern Anal. Mach. Intell., vol. 14, No. 2, pp. 239-256, 1992.

P. Viola and M. Jones, "Rapid object detection using a boosted cascade of simple features," in Proc. of IEEE Int'l Cont on Computer Vision and Pattern Recognition, 2001, pp. 511-518.

B. Georgescu, X. S. Zhou, D., Comaniciu, and A. Gupta, "Database-guided segmentation of anatomical structures with complex appearance," in Proc. of IEEE Int'l Cont on Computer Vision and Pattern Recognition, 2005, pp. 429-436.

* cited by examiner

ROBUST CLICK-POINT LINKING WITH GEOMETRIC CONFIGURATION CONTEXT: INTERACTIVE LOCALIZED REGISTRATION APPROACH

CROSS-REFERENCE TO RELATED APPLICATIONS

This is a U.S. non-provisional application of U.S. provisional patent application Ser. No. 60/792,507, filed Apr. 17, 2006, by Okada et al., the entirety of which application is incorporated herein by reference.

FIELD OF THE INVENTION

This invention relates to a system and method for facilitating registration of images, and more particularly to a system and method for aligning a pair of medical image data to achieves a high degree of spatial correspondence between images.

BACKGROUND OF THE INVENTION

Registration is one of the key problems in medical image analysis. For mono-modal registration, it aims to recover a geometric transformation to align a pair of image data, which are different in some parts, so that the pair achieves the highest spatial correspondence. Many clinically important tasks, such as change analysis and data fusion, demand precise spatial alignment of such a data pair.

Traditional solutions for the mono-modal registration problem aim to find a domain mapping of specific type which minimizes overall mismatching errors. For rigid registration, such overall errors are of global nature, averaged over the entire domain. For non-rigid registration, the errors can be treated locally but some global regularization constraints are often exploited for making the problem tractable. These global factors enable to establish correspondences of the dissimilar data parts. At the same time, however, the global factors allow the dissimilar parts to influence overall registration accuracy even at similar parts. Moreover, in these solutions, specific choice of data and cost function dictate where the registration is accurate or inaccurate, disregarding any available clinical semantics and demands.

SUMMARY OF THE INVENTION

The present application discloses a technique for robust click-point linking, which is a novel localized registration framework that allows users to interactively prescribe a location where the accuracy has to be high. The inventors assume that a user (or an autonomous agent) specifies a point location which is placed near a region of interest in one of the data pair. Such a user-provided point location is called a Point of Interest or "POI." The task of the interactive localized registration is then to find the point in the other data which corresponds to the given POI in the original data. In this application, the inventors consider an application scenario of the longitudinal 3D data studies where a set of follow-up studies of the same patient are subjected for analysis. It is assumed that the POIs are given by mouse-clicks of users. Then the click-point linking problem is solved by automatically linking a mouse-click location in one data to the corresponding point in the other. This framework advocates to interpret the aforementioned general registration problem as: (1) establishing a point-wise correspondence at a specific point and (2) doing this sequentially for different points.

One of the main advantages of this interactive localized registration approach is that it is faithful to how the registration results are used in practice. In many clinical settings, medical images are only assessed locally. When evaluating a specific lesion or anatomy, the registration accuracy at the target location must be high. However, practitioners are not often concerned if other non-target regions are also correctly registered nor if the data pair is aligned with the minimum average error. Such a local focus of interest also facilitates better accuracy and efficiency by ignoring influences from, and avoiding computations of, the non-target regions away from a POI, respectively.

On the other hand, the main challenge of this framework is how to link corresponding regions that are changing or intrinsically different. Suppose a follow-up data pair is to be studied, containing liver tumors imaged before and after a therapy. To quantify the therapy's effectiveness, a registration of the data pair would be required, followed by a change analysis. This is a classical circular problem, since the registration is required for analyzing interesting temporal changes but the very changes make the registration difficult. The localized registration makes the problem even worse because it demands a harder task of finding a correspondence between visually very dissimilar local regions.

To address the above challenge, the inventors have developed a local registration solution using geometric configuration context. Point-wise correspondence is established by exploiting geometrical configuration of a given POI relative to other stable data points. More importantly this is done without using local appearance/intensity information that are potentially unreliable. This solution exploits a set of scale-invariant saliency feature points (see, e.g., T. Kadir and M. Brady, "Saliency, scale and image description," *International Journal of Computer Vision*, vol. 45, no. 2, pp. 83-105, 2001; X. Huang, Y. Sun, D. Metaxas, F. Sauer; C. Xu, "Hybrid image registration based on configural matching of scale-invariant salient region features," in *Second IEEE Workshop on Image and Video Registration, in conjunction with CVPR '04*, 2004; and D. Hahn, Y. Sun, J. Homegger, C. Xu, G. Wolz, and T. Kuwert, "A practical salient region feature based 3D multimodality registration method for medical images," in *SPIE Med. Imag.*, 2006), detected first for each data. Then, an arbitrary POI can be geometrically represented with respect to a set of the saliency feature locations. The geometric configuration context (GCC) is defined to be a Gaussian mixture that models a spatial likelihood of the POI given the set of the features. A GCC, defined in one data domain given a POI, can be transferred to the other data domain when rough correspondences of the feature point set are available. The maximum likelihood estimate of the transferred GCC in the new domain provides the desired corresponding point and can be efficiently solved by using the variable bandwidth mean shift method (see, e.g., D. Comaniciu, "An algorithm for data-driven bandwidth selection," *IEEE Trans. Pat. Anal. Mach. Intell*, vol. 25, no. 2, pp. 281-288, 2003).

The disclosed registration framework is inspired by a recent development in the part-based object recognition research (see, e.g., R. Fergus, P. Perona, and A. Zisserman, "Object class recognition by unsupervised scale-invariant learning," in *IEEE Conf. on Computer Vision and Pattern Recognition*, vol. 2, 2003, pp. 264-271; and B. Epshtein and S. Ullman, "Identifying semantically equivalent object fragments," in *IEEE Conf. on Computer Vision and Pattern Recognition*. vol. 1, 2005, pp. 2-9). Epshtein and Ullman recently proposed an automatic algorithm for detecting semantically equivalent but visually dissimilar object parts, exploiting likelihood models similar to ours. Our work can be interpreted as a flexible online learning version of their framework where the bootstrapped likelihood is estimated from the test data instance rather than a disjoint training data set. Landmark-based registration (see, e.g., X. Pennec, N. Ayache, and J. Thirion, "Landmark-based registration using features identified through differential geometry," in *Handbook of Medical Imaging*, Academic Press, 2000, pp. 499-513), is also related to the proposed framework in the sense that both assume user-provided point locations where the registration must be accurate. They, however, aim at different technical and application goals. While the robust click-point linking seeks to establish a correspondence between a volume pair given a POI, the landmark-based registration aims to estimate domain transformation given a set of user-provided correspondences. The click-point linking is localized while the landmark-based registration aims to achieve entire smooth domain mapping that intersects given correspondences. The disclosed technique also aims to improve the previous saliency feature-based registration solutions (see, e.g., X. Huang, Y. Sun, D. Metaxas, F. Sauer, and C. Xu, "Hybrid image registration based on configural matching of scale-invariant salient region features," in *Second IEEE Workshop on Image and Video Registration, in conjunction with CVPR '04*, 2004; and D. Hahn, Y. Sun, J. Homegger, C. Xu, G. Wolz, and T. Kuwert, "A practical salient region feature based 3D multimodality registration method for medical images," in *SPIE Med. Imag.*, 2006), by using the mean shift algorithm (see, e.g., D. Comaniciu, "An algorithm for data-driven bandwidth selection," *IEEE Trans. Pat. Anal. Mach. Intell*, vol. 25, no. 2, pp. 281-288, 2003.) Mean shift is a popular computer vision solution for tracking and segmentation. Although the mean shift algorithm has successfully been applied to the medical image segmentation problem (see, e.g., K. Okada, D. Cornaniciu, and A. Krishnan, "Robust anisotropic Gaussian fitting for volumetric characterization of pulmonary nodules in multislice CT," *IEEE Trans. Med. Imag.*, vol. 24, no. 3, pp. 409-423, 2005), the inventors believe that the present disclosure is the first application to the medical image registration problem.

This application presents three instances of the above GCC-based framework considering: (1) pure translation, (2) scaling and translation, and (3) similarity transform (scaling, translation and rotation). Performance of this system has been evaluated by using sixteen whole body CT follow-up data that are manually annotated. The concept of this click-point linking has been previously proposed in the context of lung nodule detection (see, e.g., C. Novak, H. Shen, B. Odry, J. Ko, and D. Naidich, "System for automatic detection of lung nodules exhibiting growth," in *SPIE Med. Imag.*, 2004). However the present disclosure aims to solve this problem in a general setting, beyond their lung nodule context, with an emphasis of handling visually dissimilar regions.

BRIEF DESCRIPTION OF THE DRAWINGS

The accompanying drawings illustrate preferred embodiments of the invention so far devised for the practical application of the principles thereof, and in which.

DETAILED DESCRIPTION

Figure 1:
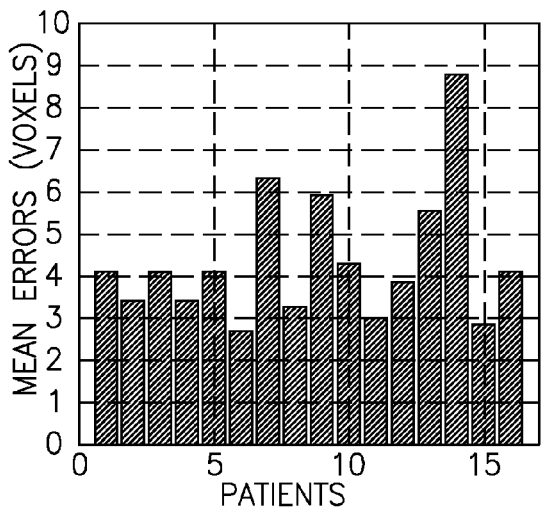
FIG. 1 shows graphical representations of experimental results of registering medical image volume pairs using the inventive technique.
Figure 1:
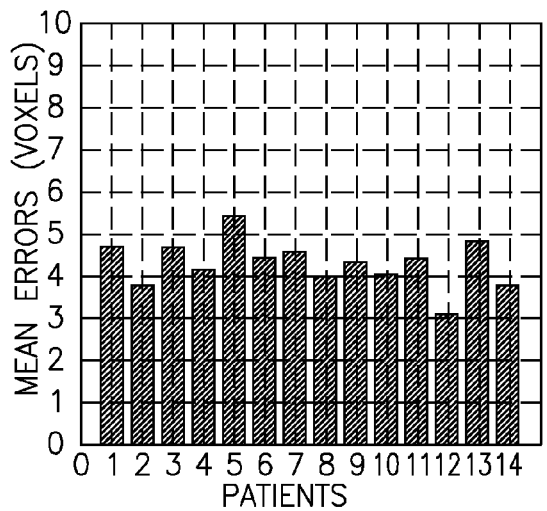
Figure 1:
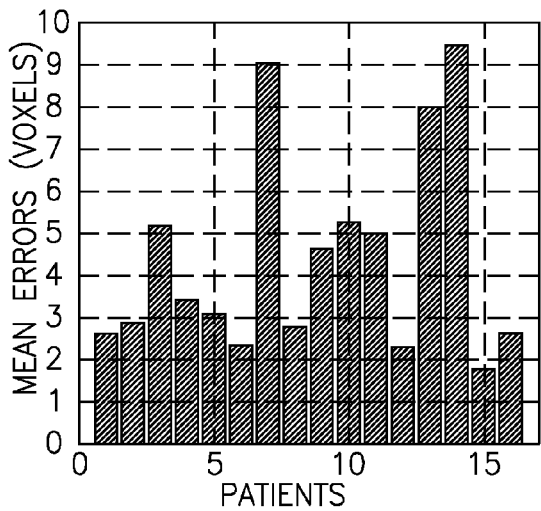
Figure 1:
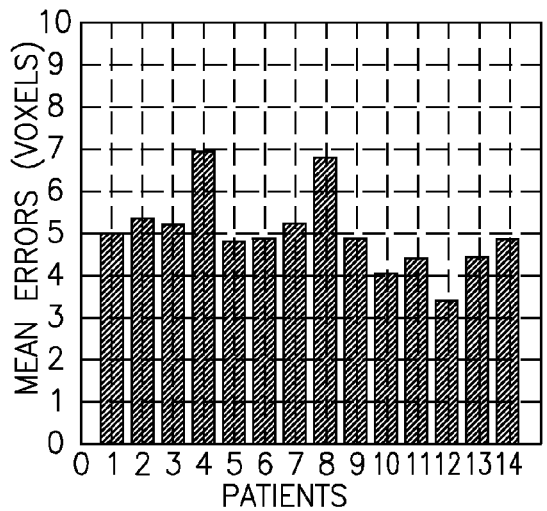
Figure 1:
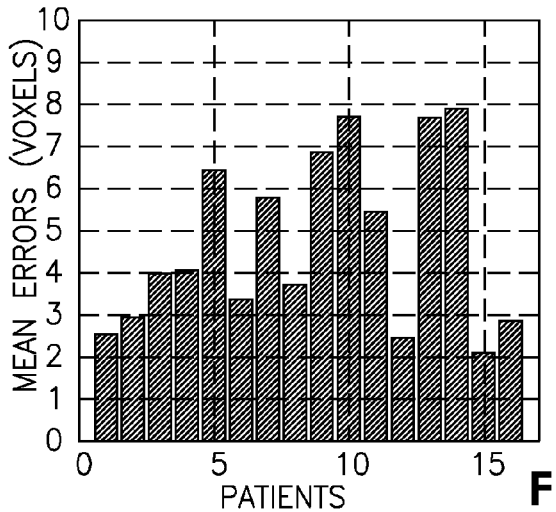
Figure 1:
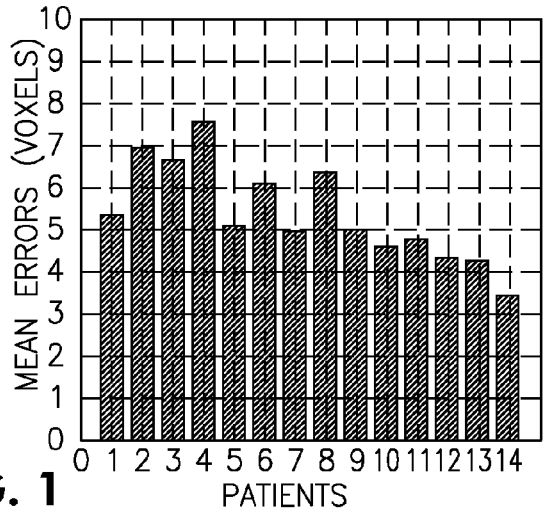

This application is organized as follows. The following section describes GCC and the solution using the GCC to the problem of robust click-point linking in 3D under pure translation. Sec. II-A formally defines the robust click-point linking problem and overviews its solution using the GCC. Some terminologies and symbols used throughout this application are also defined in this section. Sec. II-B and II-C describe the algorithms used for extracting saliency features and for estimating feature correspondences between a volume pair using an exhaustive search-based strategy. Sec. II-D proposes a GCC that represents a spatial likelihood function of the point corresponding to a given POI. Sec. II-E introduces the optimization solutions used for solving the maximum likelihood estimation of the GCC. The following two sections consider extending the above approach to more general class of implicit domain transformation. Sec. III describes such a generalized framework, and Sec. IV elaborates further on how such a solution can be derived under transformations up to similarity without explicitly estimating the domain transformation. Sec. V describes an alternative to the saliency features used as geometrical anchors. Sec. VI evaluates the feasibility of the proposed methods.

II. Robust Click-Point Linking

A. Definition and Overview

Suppose we are given a pair of image functions to be registered. Without loss of generality, one is called Reference Image denoted by $I_r(x_r)$ and the other Floating Image denoted by $I_f(x_f)$, where $x_r \in R^3$ and $x_f \in R^3$ denote coordinate variables in their respective continuous domains. The pair of the domains are assumed to be implicitly related by an unknown transformation $T_\theta$ parameterized by $\theta$, $$X_r \xrightarrow{T_\theta} X_f$$

(1)

The task of click-point linking is defined as the estimation of the point $c_f$ in the floating image $I_f(x_f)$ which corresponds to a given click point or POI $c_r$ in the reference image $I_r(x_r)$. The true solution $c_f$ can be defined if we know the true domain transformation $T_\theta$, $$c_f = T_\theta(c_r) \quad (2)$$

Next we introduce salient features whose 3D coordinate is denoted by P. Suppose now that we compute a set $C_r$ of $N_r$ features for the reference, and a set $C_f$ of $N_f$ features for the floating image, respectively, $$C_r = \{P_r 1, \ldots, P_r N_r\} \quad (3)$$

$$C_f = \{P_f 1, \ldots, P_f N_f\} \quad (4)$$

We let Q denote a set of M corresponding feature pairs Q constructed from $C_r$ and $C_f$, $$Q = \{(q_r 1, q_f 1), \ldots, (q_{rM}, q_{fM})\} \quad (5)$$

where $q_{ri} \in C_r$, $q_{fi} \in C_f$ and $M \le \min(N_r, N_f)$.

The standard registration solutions aim to estimate the domain transformation $\hat{T}_\theta$ by solving an energy minimization problem $\hat{\theta}=\mathrm{argmin}_\theta E(\theta,I_r,I_f)$. For example, the feature-based registration can be solved by using the iterative closest point (ICP) algorithm which estimates $\hat{\theta}$ and Q simultaneously so that $q_{f_i} \cong T_\theta(q_{r_i})$ (see, e.g., P. J. Besl and N. D. McKay, "A method for registration of 3-d shapes," *IEEE Trans. Pattern Anal. Mach. Intell.*, vol. 14, no. 2, pp. 239-256, 1992). Once the domain transformation is estimated correctly, the click-point linking becomes trivial as $\hat{c}_f = \hat{T}_\theta(c_r)$. However, estimating the transformation from noisy data is far from trivial. The estimation accuracy is very sensitive to the errors in correspondences. The iterative solutions, such as ICP, also tend to be computationally expensive.

In the inventive approach, the linking problem is solved by directly optimizing a spatial likelihood function over the location variable $x_f$ without explicitly estimating the domain transformation, $$\hat{c}_f = \arg\max_{x_f} L(x_f | c_r, Q) \tag{6}$$

where $L(x_f | c_r, Q)$ denotes a spatial likelihood function in the domain of the floating image that is conditional to the POI $c_r$ in the reference image and a set of corresponding features Q. This generic maximum likelihood formulation allows us to exploit the mean shift algorithm which allows computational efficiency and desired robustness against false correspondences. The following describes details of the solution in steps.

B. Scale-Invariant Saliency Feature Extraction

The line of research on feature-based matching methods has long been restrained by the question: what features to use? An interesting feature selection criterion was proposed for tracking objects under occlusion and dis-occlusion situations in J. Sill and C. Tomasi, "Good features to track," in *IEEE Conf. On Computer Vision and Pattern Recognition*, 1994, pp. 593-600. The criterion states that the right features for tracking are exactly those that make the tracker work best. The intuition there is that goals of an application decide the choice of methodology. Applying similar reasoning, the good features to use in the context of producing reliable correspondences should be those that are "unique" or "rare". That is, given a feature from the reference image, we consider it "good" if the likelihood of it having multiple corresponding features on the matching image is low. Features that satisfy this criterion are increasingly being studied and used for image registration and object tracking purposes. Most notably, a scale-invariant salient "region" feature detector is proposed in T. Kadir and M. Brady, "Saliency, scale and image description," *International Journal of Computer Vision*, vol. 45, no. 2, pp. 83-105, 2001. The salient regions are selected as those local image regions with highest saliency in both spatial and scale spaces. The saliency and best scale of a local region are determined based on entropy-based criteria. The application of the salient region features to image registration has been studied in both 2D (see, e.g., X. Huang, Y. Sun, D. Metaxas, F. Sauer, and C. Xu, "Hybrid image registration based on configural matching of scale-invariant salient region features," in *Second IEEE Workshop on Image and Video Registration, in conjunction with CVPR '04*, 2004) and 3D (see, e.g., D. Hahn, Y. Sun, J. Homegger, C. Xu, G. Wolz, and T. Kuwert, "A practical salient region feature based 3D multimodality registration method for medical images," in *SPIE Med. Imag.*, 2006), and one of the main advantages of the region features has been shown to be their invariant to rotation, translation and scale (see, e.g., X. Huang, Y. Sun, D. Metaxas, F. Sauer, and C. Xu, "Hybrid image registration based on configural matching of scale-invariant salient region features," in *Second IEEE Workshop on Image and Video Registration, in conjunction with CVPR '04*, 2004.) In the present disclosure, the inventors use the salient region feature detector in 3D to extract features from CT volumes.

First, for each voxel x in a CT volume I, a probability density function (p.d.f) $p(i|R_{(s,x)})$ is computed from the intensity values i in a spherical region $R_{(s,x)}$ of certain scale described by a radius s and centered at x, $$p(i|R_{(s,x)}) = \frac{1}{V(R_{(s,x)})} \int\int_{R_{(s,x)}} \frac{1}{\sqrt{2\pi}\sigma} e^{-\frac{(i-I(y))^2}{2\sigma^2}} dy \tag{7}$$

where i takes on values in the set of all possible intensity values, $V(R_{(s,x)})$ denotes the volume of the local region $R_{(s,x)}$, y represents voxels in the region $R_{(s,x)}$, and $\sigma$ is a constant specifying width of the Gaussian kernel in the nonparametric kernel-based p.d.f. estimation above. ($\sigma$ can be set to a constant value, for instance, 10, for all CT volumes.)

Given the intensity p.d.f. of the region, the differential entropy of its intensity distribution is defined by, $$H(R_{(s,x)}) = -\int_{i(s,x)} p(i|R_{(s,x)}) \log_2(p(i|R_{(s,x)})) di \tag{8}$$

where i(s,x) denotes the range of intensity values inside the region $R_{(s,x)}$.

Then the best scale $S_x$ for the region centered at x is selected as the one that maximizes the local entropy: $S_x = \mathrm{argmax}_s H(R_{(s,x)})$. Consequently the saliency value $A(R_{(s_x,x)})$ for the region with the best scale is defined by the extremum entropy value weighted by the best scale $S_x$ and a differential self-similarity measure in the scale space, $$A(R_{(s_x,x)}) = H(R_{(s_x,x)}) \cdot S_X \cdot \int_{i(s,x)} \left\| \frac{\partial}{\partial s} p(i|R_{(s,x)}) \right|_{S_X} \right\| di \tag{9}$$

Since the above saliency metric is applicable over both spatial and scale spaces, the saliency values of region features at different locations and scales are comparable.

Next in order to pick a low number N (N<100) of globally most-salient region features (each defined by its center and the best scale), the following steps of processing are introduced.

Feature Extraction:

A1 For each voxel location x, compute the best scale $S_x$ of the region centered at it, and its saliency value $A(R_{(s_x,x)})$ A2 Identify the voxels with local maxima in saliency values. Then the salient regions of interest are those that are centered at these voxels and have the best scales.

A3 Among the local maxima salient regions, pick the N most salient ones {pi (with highest saliency values) as region features for the CT volume.

It takes about 2.5 minutes to compute the salient region features on one CT volume. This performance is acceptable in our application since the features are computed off-line before clicking points.

In clinical practice, the 12-bit positive-valued CT volume data is typically converted to the Hounsfield unit (HU) that is the standard physical unit of the CT numbers. The data used in this study ranges from 0 to 4095 and is related to HU with the offset of −1024 and the slope of 1. For visualizing specific types of tissues in the standard 8-bit grayscale, windowing is commonly applied to the HU values. In this study, we use a specific windowing between 30 and 285 HU for suppressing certain types of flexible tissues such as fat (−100 to −50 HU)

and water (0 HU). Removing such flexible tissues helps to stabilize the feature extraction process, focusing on more rigid structures that allow to establish correspondences between different time-points.

C. Feature Correspondence Matching

Both reference and floating images $I_r(X_r)$ and $I_f(x_f)$ are independently subjected to the procedure described in the previous section II-B for extracting the scale-invariant features. This results in a pair of sets, denoted by $C_r$ and $C_f$, of $N_r$ and $N_f$ features for the $I_r$ and $I_f$ as defined in Equations (3) and (4), respectively.

Given a POI $c_r$ in the reference domain xr, we find a set Q of M corresponding features, as defined in Equation (5), by using the following exhaustive search strategy.

Feature Matching By Exhaustive Search:

B1 Select $M<N_r$ features $\{q_{r1}, \ldots, q_{rM}\}$ from $C_r$ which are closest to $c_r$ in terms of Euclidean distance.

B2 For each reference feature $q_{ri}$,

B2a Exhaustively compute appearance-based similarities against the $N_f$ floating domain features $\{p_{fj}\}$ from $C_f$. The appearance similarity is measured by $x^2$ distance between a pair of intensity histograms derived from circular regions $R(sq_{ri}, q_{ri})$ and $R(sp_{fj}, p_{fj})$ centered at $q_{ri}$ and $p_{fj}$, respectively.

B2b Select the most similar $p_{fj}$ and set it as $q_{fi}$

Notice that this is a very simple matching algorithm, which is meant to provide only rough results. The above exhaustive search can be less accurate in comparison to more complex approaches such as ICP. It is thus likely that Q contains a non-negligible amount of false correspondences. However its computational complexity is expected to be significantly lower than other complex approaches, allowing us to realize more efficient solution.

D. Spatial Likelihood Modeling

This subsection describes how to model the spatial likelihood function $L(x_f|c_r,Q)$. The way such a model can be constructed depends on the class of transformation we consider in $T_\Theta$. For illustrative purpose, we first demonstrate the model construction for the simplistic translation only transformation. Extension to more generic class of transformations will be discussed in Section III.

For both reference and floating domains, we first introduce a local frame whose origin in set at each saliency feature location, $$x_r = x_{ri} + p_{ri} \quad (10)$$

$$x_f = x_{fi} + p_{fi} \quad (11)$$

where $x_{ri}$ and $x_{fi}$ denote coordinate values in the local frame centered at feature $p_{ri}$ in the reference domain and $p_{fi}$ in the floating domain, respectively.

We define the geometric configuration context or GCC in the reference domain $x_r$ as a M-component Gaussian mixture. This mixture model represents a spatial likelihood of POI location $c_r$ with respect to a set of M saliency features $\{q_{ri}\}$ from Q, $$L(x_r | c_r, C_r) = L(x_r | c_r, q_{r1}, \ldots, q_{rM}) = \sum_{i=1}^{M} p(x_r | q_{ri}, c_r) \quad (12)$$

$$p(x_r | q_{ri}, c_r) = N(x_r; m_{ri}, \sigma_{ri}^2 I) \quad (13)$$

$$m_{ri} = c_r = c_{ri} + q_{ri} \quad (14)$$

$$\sigma_{ri} = f_r(Sq_{ri}) \quad (15)$$

where I is the 3D identity matrix, $m_{ri}$ and $\sigma_{ri}$ denote the respective mean and width of the i-th Gaussian component, $c_{ri}$ is 3D coordinates of the POI in a local frame centered at $q_{ri}$, $Sq_{ri}$ is the isotropic scale associated with saliency feature $q_{ri}$, and $f_r$ is a function that relates the feature's scale to the Gaussian width. Note that a GCC in the reference domain forms a mixture of M concentric Gaussian components because we know exactly where the POI is in the domain. Therefore, the resulting likelihood is convex with a unique maximum at the POI location. On the other hand, the 3D vector $c_{ri}$ in the i-th local frame defines a geometrical relation of the POI with respect to the saliency feature location $p_{ri}$.

Finally, we define the desired GCC representing a spatial likelihood of the point in the floating domain $x_f$ which corresponds to the POI given in $x_r$, $$L(x_f | c_r, Q) = L(x_f | c_r, (q_{r1}, \ldots, q_{f1}), \ldots, (q_{rM}, q_{fM})) \quad (16)$$

$$= \sum_{i=1}^{M} p(x_f | q_{fi}, q_{ri}, c_r)$$

$$p(x_f | q_{fi}, q_{ri}, c_r) = N(x_f; m_{fi}, \sigma_{fi}^2 I) \quad (17)$$

$$m_{fi} = g_t(c_r, Q) = c_r - q_{ri} + q_{fi} \quad (18)$$

$$\sigma_{fi} = f_t(c_r, Q) = \frac{Sq_{ri} + Sq_{fi}}{2} \quad (19)$$

where $g_t$ denotes a function that relates $c_r$ and Q to the mean of the i-th Gaussian component with respect to feature $q_{fi}$, and $f_t$ denotes a function that relates $Sq_{ri}$ and $Sq_{fi}$ to the width of the i-th Gaussian component.

Recall that underlying transformation $T_\Theta$, relating local frames centered at $q_{ri}$ and $q_{fi}$ as defined in Equations (10) and (11), is assumed here to consist only of linear rigid translation. Then $x_{fi}$ must be equivalent to $x_{ri}$ since a vector is invariant under pure translation. As a consequence, the derivation of Equation (18) could be interpreted as transferring the Gaussian component as defined in Equation (13) in the reference domain $x_r$ to the floating domain $x_f$ using the correspondence between $q_{ri}$ and $q_{fi}$ under the above pure translation assumption. First we employ Equation (10) for specifying the POI in the i-th reference local frame $$c_r = c_{ri} + q_{ri} \quad (20)$$

Then the mean $m_{fi}$ is defined to be equivalent to $c_f$ expressed in the i-th floating local frame as in Equation (11). Subsequently, we apply the translation invariance $c_{fi} = c_{ri}$ and substitute Equation (20), resulting in the form shown in Equation (18)

$$m_{fi} = c_f \quad (21)$$

$$= c_{f_i} + q_{fi}$$

$$= c_{r_i} + q_{fi}$$

$$= c_r - q_{ri} + q_{fi}$$

For modeling the Gaussian width, we interpret each feature's scale, derived by the aforementioned maximum entropy algorithm, as statistical uncertainty of the point localization. Since the mean estimator (21) is balanced between the features $q_{ri}$ and $q_{fi}$ in both domains, we model the Gaussian width to be the unbiased mean of the pair of estimated scales as shown in (19).

The mixture model (16) of the spatial likelihood $L(x_f|c_r,Q)$ consists of Gaussian components with varying mean and width unlike the case in (12). This is due to the measurement errors causing variance in the extracted feature locations across different time-points. Moreover the failed feature correspondences in Q can make the mean estimate largely deviated from the true mean. The Gaussian width is also variant because the scale estimates $Sq_{ri}$ and $Sq_{fi}$ are spatially variant.

E. Mean Shift-Based Robust Maximum Likelihood Estimation

This section describes our robust and efficient solution for the maximum likelihood estimation problem in (6) with the likelihood model defined in (16) to (19). Due to the feature matching errors discussed in Sec. II-C and II-D, the likelihood function becomes multi-modal with the false correspondences creating outlier modes. The task to be solved then becomes estimating the mixture mode due only to the correctly found correspondences. In other words, the right mode must be selected among outliers within an arbitrary distribution. This task is solved by using the variable-bandwidth mean shift (VBMS) method proposed in D. Comaniciu, "An algorithm for data-driven bandwidth selection," *IEEE Trans. Pat. Anal. Mach. Intell*, vol. 25, no. 2, pp. 281-288, 2003. The mean shift is an efficient and provably-convergent gradient-ascent algorithm with adaptive iteration step size. The original algorithm was designed to analyze mode structures of kernel density estimate given a data point set. In this setting, the kernel bandwidth is often considered to be spatially constant. The VBMS extends the above mean shift framework to the case with spatially variable bandwidth where different data points have different significance. This extension allows its application to analyze the mode structures of generic Gaussian mixture models as well as to solve the general information fusion problem where the task is to estimate the most plausible solution given a set of hypotheses. The following briefly summarizes the VBMS framework.

Let $x_i \in R^3, i=1,\ldots,M$ denote a set of 3D data points, and $H_i$ is a 3D matrix indicating uncertainty or significance associated with the point $x_i$. The point density estimator with 3D normal kernel at the point x is given by:

$$\hat{f}_v(x) = \sum_{i=1}^{M} N(x; x_i, H_i) \qquad (22)$$

$$= \frac{(2\pi)^{-3/2}}{M} \sum_{i=1}^{M} |H_i|^{-1/2} \exp\left(-\frac{1}{2}(x-x_i)^T H_i^{-1}(x-x_i)\right)$$

The VBMS vector $m_v(x)$ is then defined by $$m_v(x) = H_h(x) \sum_{i=1}^{M} w_i(x) H_i^{-1} x_i - x \qquad (23)$$

where $H_h(x)$ denotes the data-weighted harmonic mean of the bandwidth matrices at x $$H_h^{-1}(x) = \sum_{i=1}^{M} w_i(x) H_i^{-1} \qquad (24)$$

and the weight $w_i(x)$ represents the influence from i-th component at x normalized over all the components $$w_i(x) = \frac{|H_i|^{-1/2} \exp\left(-\frac{1}{2}(x-x_i)^T H_i^{-1}(x-x_i)\right)}{\sum_{i=1}^{M} |H_i|^{-1/2} \exp\left(-\frac{1}{2}(x-x_i)^T H_i^{-1}(x-x_i)\right)} \qquad (25)$$

It can be shown that the VBMS vector is an adaptive estimator of normalized gradient of the underlying density:

$$m_v(x) = H_h(x) \frac{\hat{\nabla} f_v(x)}{f_v(x)}.$$

The following iterative algorithm with the VBMS vector is provably convergent to a mode of the density estimate in the vicinity of the initialization $x_{init}$ in the gradient-ascent sense but without nuisance parameter tuning $$y_0 = x_{init}$$

$$y_{n+1} = m_v(y_n) + y_n \qquad (26)$$

We denote the convergence of the iterator by $y^*$.

Two robust algorithms are used for the maximum likelihood estimation of the multi-modal likelihood model (16) using the above VBMS algorithm (26). The application of the algorithm to the specific model in (16) is straightforward, simply setting $x_i = m_{fi}$ and $H_i = \sigma_{fi}^2 I$ as defined in (18) and (19), respectively. The first solution, Single VBMS, involves a single VBMS iteration from an initialization $x_{init}$ estimated from $C_r$ and $C_f$ under the pure translation assumption. On the other hand, the second solution, Multiple VBMS, involves voting among a set of convergences from multiple VBMS iterations initialized at each component mean $m_{fi}$.

SingleVBMS:

C1 Compute the means $z_r$ and $z_f$ of saliency feature points in $C_r$ and $C_f$, respectively.

C2 Compute the mean bias $z = z_f - z_r$ between $C_r$ and $C_f$.

C3 Set the initialization of a VBMS iterator by the mean bias-corrected POI in the floating domain: $x_{init} = c_r + z$ C4 Perform the VBMS algorithm in (26), resulting in the convergence $y^*$ C5 Results in the linking estimate $\hat{c}_f = y^*$.

MultipleVBMS:

D1 Initialize M VBMS iterators with M component means $\{m_{fi}\}$ in (18): $x_{init,i} = m_{fi}$.

D2 Perform M independent VBMS iterations (26), resulting in a set of convergence $\{y^*_i\}$.

D3 Group $\{y^*_i\}$ according to their pairwise Euclidean distances and select a subset $\{y^*_k\}$ that forms a cluster containing most members.

D4 Results in the linking estimate by the mean of the subset:

$$\hat{c}_f = \frac{1}{K} \sum_{k=1}^{K} y_k^*$$

The former solution emphasizes on efficiency since it involves only a single VBMS iteration. However the estimation accuracy is largely dependent upon the estimated initialization. This solution is not effective when, between the volume pair, there exists large variation in the saliency features as well as deformation beyond the pure translation. The latter solution improves its robustness by performing multiple VBMS iterations. The solution is less efficient than the former however it is more general since it does not assume any specific domain transformation.

III. Extension to General Transformation Class

As mentioned in Sec. II-D, the spatial likelihood function (16) in the floating domain depends on what type of underlying domain transformation is considered. For instance, the formulae for the component Gaussian mean and width in (18) and (19) do not hold true under transformations beyond pure translation. This is because the derivation of (18), as demonstrated in (21), exploits an invariance property specific to the transformation class. This section discusses how we can generalize the strategy used for modeling the likelihood to more general class of transformations.

Recall that Q denotes a set of M correspondences between saliency features in the reference and floating domains, computed by using the procedure described in Sec. II-C. Each correspondence $q_i$ is represented by a 2-tuple $(q_{ri}, q_{fi})$. Suppose that P denotes a set of all K-subsets of Q such that $$P = \{P_l | l=1, \ldots, L\} \quad (27)$$

$$L = \binom{M}{k}$$

$$P_l = \{q_k | k=1, \ldots, K\}$$

$$q_k = (q_{rk}, q_{fk}) \in Q$$

where L is cardinality of P, and $P_l$ is a K-subset of Q. Without a loss of generality, we arbitrary select a single correspondence $q_k$ from $P_l$ and call it an anchor correspondence $q_l = (q_{rl}, q_{fl})$, resulting in a set of anchors for each K-subset $\{q_l\} l=1, \ldots, L\}$.

Given the above setup, we now consider extending the spatial likelihood function, defined in (16-19), to general classes of linear transformation. The generalized spatial likelihood is defined as a mixture of L Gaussian components similar to the case with the pure translation described in Sec. II-D.

$$L(x_f | c_r, P) = L(x_f | c_r, P_1, \ldots, P_L) \quad (28)$$

$$= \sum_{l=1}^{L} p(x_f | P_l, c_r)$$

$$p(x_f | P_l, c_r) = N(x_f; m_{fl}, \sigma_{fl}^2 I) \quad (29)$$

$$m_{fl} = g_g(c_r, P_l) \quad (30)$$

$$\sigma_{fl} = f_g(c_r, P_l) \quad (31)$$

Notice that they assume the form similar to (16-19) except the functions $g_g$ and $f_g$ that depend on specific transformation classes. The likelihood function is also now dependent to the set P instead of Q. Therefore each Gaussian component depends on the set $P_l$ consisting of K feature correspondences.

Now we presume that the underlying domain transformation $T_\Theta$ can be modeled by a certain generic parametric model and that a set of K correspondences given in $P_l$ are sufficient to determine the domain transformation uniquely. Then the following provides a general procedure for determining $g_g$ and $f_g$ for the class of transformation.

Mean and Width of l-th Gaussian Component Given $P_l$:
E1 estimate transformation parameter $\hat{\theta}_l$ using $P_l$.
E2 $g_g$: compute the l-th component mean by $m_{fl} = \hat{T}_{\theta_l}(c_r)$.
E3 $f_g$: compute the l-th component width as a function of scales of all feature points in $P_l$.

The above likelihood formulation provides a generic framework to handle different classes of domain transformation by choosing an appropriate K value. Higher K values are required to handle more complex transformations with larger degrees of freedom (DOF). In $R^3$, for instance, the likelihood function with K=3 can handle transformations up to similarity. The likelihood with K=2 can determine transformations with scaling and translation only. With K=1, we can handle only pure translation. It is straightforward to show that the spatial likelihood function in (16-19) is a specific instance of the generalized likelihood (28-31) with K=1. In such condition, the set P, defined in (27), reduces to Q so that P=Q and L=M. The original mean and width formula in (18) and (19) satisfy the procedure in E1-E3, resulting in the equivalence with $g_g = g_t$ and $f_g = f_t$ for K=1.

The function $f_g(c_r, P_l)$ determines the width of the l-th Gaussian component. As discussed in Sec. II-D, we can interpret scales $S_{q_{rk}}$ and $S_{q_{fk}}$ of the saliency features in $P_l$ as statistical uncertainty for localizing the feature points. Such uncertainties at the feature locations must be transferred to the location of the estimated component mean $m_{fl}$ by propagating them through the transformation $T_{\theta_l}$. It may be assumed, however, that deformation due to the domain transformation is not too large, allowing the change due to the propagation to be treated as negligible. Therefore the uncertainties at the features can also be treated as uncertainties at the estimated component mean. In this study, we consider uncertainty mean as a simple instance of fusing the set of uncertainties.

$$\sigma_{fl} = f_g(c_r, P_l) = \frac{\sum_{k=1}^{K} S_{q_{rk}} + \sum_{k=1}^{K} S_{q_{fk}}}{2K} \quad (32)$$

IV. Invariance-Based Implicit Transformation ESTIMATION

The procedure E1-E3, described in the previous section, involves the explicit estimation of the transformation parameters $\theta_l$ from each K-subset $P_l$; of the original correspondences in Q. For our goal of establishing the link between $c_r$ and $c_f$, as well as $m_{rl}$ and $m_{fl}$, there exist more intuitive geometric interpretation of the estimation problem which may lead to more efficient solutions. In this section we offer such alternative solutions that specify the mean of the l-th Gaussian component based on geometric invariances without explicit parameter estimation as in E1 and E2.

For certain K values and their corresponding classes of allowed transformation, we construct an estimator of $m_{fl}$ using geometric invariances that are true under the specific transformation classes. The following introduces the setting. We consider a pair of Reference Local Frame and Floating Local Frame, as defined in (10) and (11). We set the origin of these two local frames at anchor points $q_{rl}$ and $q_{fl}$ that are corresponding to each other. By definition, described in Sec. III, a set of K correspondences given in $P_l$ can sufficiently determine the underlying domain transformation $T_{\theta_l}$. Assume that the transformation $T_{\theta_l}$ is implicitly estimated given $P_l$. The mean $m_{fl}$ of l-th Gaussian component is then defined by a function $g_g$ which provides $\hat{c}_f$ given the POI $c_r$ under the constraints given in the implicit estimate: $m_{fl} = \hat{c}_f = g_g(c_r) = \hat{T}_{\theta_l}(c_r)$.

There are two important issues. The first is that the transformation $\hat{T}_{\theta_l}$ considered here is defined in the local frames so that each transformation instance for each subset $P_l$ is different from one another unlike the case in the procedure E1-E3. This does not, however, add any extra computational burden because the procedure E1-E3 also recomputes the transformation in the global frame $x_f$ for each $P_l$. This combinatoric computation is also necessary for handling errors in the estimated correspondences in Q. The second is that translations in the global frames between $x_r$ and $x_f$ are absorbed in the local frame pair by setting the corresponding points in $q_l$ as origins of the frames. Thus the DOF of $\hat{T}_{\theta_l}$ in the local frames must be adjusted accordingly.

The present disclosure provides solutions for K=1,2,3 which cover domain transformations up to similarity transformation. The case with K=4 will cover affine transformation in $R^3$ however we leave its solution as our future work. For K=1, a solution has already been provided in our derivation in Sec. II-D. The condition K=1 only allows pure translation in $R^d$. Moreover vectors are invariant under this translation class of transformation in $R^d$. It is straightforward to see that the pair of local frames must be equivalent, resulting in $c_{fl} = c_{rl}$. The following examines the cases for K=1,2.

A. Scaling and Translation Transformation

In $R^3$, a K-subset $P_l$ with K=2 yields two correspondences, providing 6 constraints. These constraints are sufficient to determine the transformation with scaling and translation (4 Degrees of Freedom (DOF)) and pure translation (3 DOF).

First we employ Equations (10) and (11) for specifying the given POI and its corresponding point in the l-th reference and floating local frames centered at the anchors $q_{rl}$ and $q_{fl}$, respectively.

$$c_r = c_{rl} + q_{rl} \quad (33)$$

$$c_f = c_{fl} + q_{fl} \quad (34)$$

where $c_{fl}$ is the unknown that must be determined as a function of the knowns $c_{rl}$, $q_l$ and $P_l$.

Using the same argument for the K=1 case, scaling remains the only varying factor in the coordinate mapping between the local frames $c_{rl}$ and $c_{fl}$ after canceling the translation factor. Since $P_l$ contains only two correspondences, there is only one remainder correspondence after choosing the anchor. Let $q_{la} = (q_{rla}, q_{fla})$ denote the remainder. Also let $a_{rl}$ and $a_{fl}$ denote relative vectors $a_{rl} = q_{rla} - q_{rl}$ and $a_{fl} = q_{fla} - q_{fl}$ in the respective local frames.

The pair of correspondences in $P_l$ and of $c_{rl}$ and $c_{fl}$ can then be interpreted as a pair of similar triangles $(0, a_{rl}, c_{rl})$ and $(0, a_{fl}, c_{fl})$, where they are similar triangles of different size without rotation. This interpretation thus provides the following two invariances under scaling: normalized vector $$\frac{c_{fl}}{\|c_{fl}\|} = \frac{c_{rl}}{\|c_{rl}\|} \quad (35)$$

and ratio of vector norms.

$$\frac{\|c_{fl}\|}{\|a_{fl}\|} = \frac{\|c_{rl}\|}{\|a_{rl}\|} \quad (36)$$

where $\|\cdot\|$ denotes a vector norm. Combining (35), (36) and (33) yields the desired function estimating the l-th Gaussian component mean with K=2.

$$m_{fl} = g_g, K = 2(c_r, P_l) = \frac{\|a_{fl}\|}{\|a_{rl}\|}(c_r - q_{rl}) \quad (37)$$

B. Similarity and Euclidean Transformation

In $R^3$, a K-subset $P_l$ with K=3 yields three correspondences, providing 9 constraints. These constraints are sufficient to determine projective transformation up to similarity (7 DOF) and Euclidean (6 DOF). Six constraints given in a 2-subset are not sufficient to uniquely determine the Euclidean transformation of 6 DOF because of ambiguity for 3D rotation about the vector connecting the two points in the subset in the local frame.

Let $q_{la} = (q_{rla}, q_{fla})$ and $q_{lb} = (q_{rlb}, q_{flb})$ denote the two remainder after choosing the anchor $q_l$ from $P_l$. Also let $a_{rl}$ and $a_{fl}$ denote relative vectors $a_{rl} = q_{rla} - q_{rl}$ and $a_{fl} = q_{fla} - q_{fl}$ in the respective local frames. Similarly let $b_{rl}$ and $b_{fl}$ denote relative vectors $b_{rl} = q_{rlb} - q_{rl}$ and $b_{fl} = q_{flb} - q_{fl}$, respectively.

Three correspondences in $P_l$ and of $c_{rl}$ and $c_{fl}$ can then be interpreted as a pair of similar tetrahedra $(0, a_{rl}, b_{rl}, c_{rl})$ and $(0, a_{fl}, b_{fl}, c_{fl})$. By definition, the geometric similarity assures that each corresponding angle is equivalent and each edge is scaled by the same factor. In the following, we derive a closed-form formula of the unknown $c_{fl}$ as a function of the other knows by exploiting the geometric similarity of the tetrahedra.

Consider a 3D plane $L_{rl}$ that contains a face of the reference tetrahedron which includes two vectors $a_{rl}$ and $b_{rl}$ in the reference local frame. Similarly let $L_{fl}$ denote a 3D plane in the floating local frame, containing the face $(0, a_{fl}, b_{fl})$. We next orthogonally project vectors $c_{rl}$ and $c_{fl}$ to the planes $L_{rl}$ and $L_{fl}$, respectively. Let $u_{rl}$ and $u_{fl}$ denote such orthogonal projections. Consequently the vectors $c_{rl}$ and $c_{fl}$ can be linearly decomposed to vector sums of the orthogonal projections and vectors that are normal to the planes.

$$c_{rl} = u_{rl} + v_{rl} \quad (38)$$

$$c_{fl} = u_{fl} + v_{fl} \quad (39)$$

$$v_{rl} = k_r n_{rl}, k_r \in R \quad (40)$$

$$v_{fl} = k_f n_{fl}, k_f \in R \quad (41)$$

where $n_{rl}$ and $n_{fl}$ denote unit-normals of $L_{rl}$ and $L_{fl}$, respectively. The orthogonal projections assure that the vectors $v_{rl}$ and $v_{fl}$ are orthogonal to $(a_{rl}, b_{rl})$ and $(a_{fl}, b_{fl})$, and that $u_{rl}$ and $u_{fl}$ are contained in $L_{rl}$ and $L_{fl}$, respectively.

Now $u_{rl}$ can be written as a linear combination of $a_{rl}$ and $b_{rl}$ since it lies within $L_{rl}$. The weights can be solved explicitly by using the above orthogonal constraints.

$$u_{rl} = w_a a_{rl} + w_b b_{rl} \quad (42)$$

-continued $$w_a = \frac{(a_{rl}^T b_{rl})(b_{rl}^T c_{rl}) - \|b_{rl}\|^2 (a_{rl}^T c_{rl})}{(a_{rl}^T b_{rl})^2 - \|a_{rl}\|^2 \|b_{rl}\|^2} \in R \quad (43)$$

$$w_b = \frac{(a_{rl}^T b_{rl})(a_{rl}^T c_{rl}) - \|a_{rl}\|^2 (b_{rl}^T c_{rl})}{(a_{rl}^T b_{rl})^2 - \|a_{rl}\|^2 \|b_{rl}\|^2} \in R \quad (44)$$

Since $c_{rl}$ is known, $v_{rl}$ is determined from (38) when $u_{rl}$ is given.

$$v_{rl} = c_{rl} - u_{rl} = c_{rl} - w_a a_{rl} - w_b b_{rl} \quad (45)$$

For the floating tetrahedron, $u_{fl}$ can also be written as a linear combination of $a_{fl}$ and $b_{fl}$ as for $u_{rl}$ in (42). Furthermore, because of the geometrical similarity, the same weights in (43) and (44) defines $u_{fl}$ in the floating local frame as well.

$$u_{fl} = w_a a_{fl} + w_b b_{fl} \quad (46)$$

Now the unit-normal of $L_{fl}$ can also be derived from $a_{fl}$ and $b_{fl}$ $$n_{fl} = \frac{w_{fl}}{\|w_{fl}\|} \quad (47)$$

$$w_{fl} = \begin{pmatrix} a_{fl2} b_{fl3} - a_{fl3} b_{fl2}, a_{fl3} b_{fl1} - \\ a_{fl1} b_{fl3}, a_{fl1} b_{fl2} - a_{fl2} b_{fl1} \end{pmatrix}^T \quad (48)$$

where $a_{fl} = (a_{fl1}, a_{fl2}, a_{fl3})^T$ and $b_{fl} = (b_{fl1}, b_{fl2}, b_{fl3})^T$. It is obvious that the following ratio of vector norms is invariant under the similarity transformation.

$$\frac{\|v_{fl}\|}{\|a_{fl}\|} = \frac{\|v_{rl}\|}{\|a_{rl}\|} \quad (49)$$

Combining (41) and (49) yields an explicit form of the size factor $k_f$.

$$k_f = \frac{\|v_{rl}\| \|a_{fl}\|}{\|a_{rl}\|} \quad (50)$$

Finally plugging (46) and (41) into (39) yields the desired function estimating the l-th Gaussian component mean with K=3.

$$m_{fl} = g_{gr} K = 3(c_r, P_l) = w_a a_{fl} + w_b b_{fl} + k_f n_{fl} \quad (51)$$

where $w_a, w_b$ and $k_f$ are given in (43), (44) and (50), respectively. And $n_{fl}$ is given in (47) and (48).

V. Learning-Based Anatomical Landmark Detection

In the Geometric Configuration Context (GCC) approach for robust fusion, the corresponding point of a click point is reasoned based on the correspondences of its N nearest salient region features. We can think of these nearest salient region features as the click point's context features. Hence, in order to derive a good correspondence for the click point, it is important for a dominant portion of its N context feature correspondences to be accurate. The salient-region based features have been proven theoretically (see, e.g., T. Kadir and M. Brady, "Saliency, scale and image description," *International Journal of Computer Vision*, vol. 45, no. 2, pp. 83-105, 2001) to be invariant to translation, rotation and scaling, however, in the presence of structure appearance/disappearance, the detected features near the changed structures can change dramatically. For example, if a patient with large tumors is imaged at three different time points, the image appearance changes due to changes in the tumor, and the salient-region features detected near the tumor are not stable in the three images. Considering that a user often clicks points of interest near diseased areas, which tend to change and develop rapidly over time, the unstableness of detected salient-region features near diseased areas could be troublesome to even the robust fusion algorithm.

An alternative to the salient-region features can be anatomical landmarks that are detected using pre-learned discriminative classifiers. The learning framework is based on the real-time detection algorithm by P. Viola and M. Jones, "Rapid object detection using a boosted cascade of simple features," in *Proc. of IEEE Int'l Cont on Computer Vision and Pattern Recognition*, 2001, pp. 511-518; and B. Georgescu, X. S. Zhou, D., Comaniciu, and A. Gupta, "Database-guided segmentation of anatomical structures with complex appearance," in *Proc. of IEEE Int'l Cont on Computer Vision and Pattern Recognition*, 2005, pp. 429-436. The basic idea is to utilize a database of images, from which a learning-based algorithm can extract representations of the variations in particular anatomical structures as well as in the global anatomical relationship between structures. The method starts with collecting whole-body volumes into the database as training data. Then for each training volume, the interested landmarks are manually labeled. In order to learn a discriminative classifier for a particular landmark, the training volumes are first aligned using a weighted-alignment algorithm, which gives the landmark of interest higher weights than other landmarks. Having the aligned volumes, data centered around the landmark of interest are cropped to generate positive examples that contain the landmark, and data are cropped randomly elsewhere in the training volumes to generate negative examples. Then a discriminative classifier using a Cascaded AdaBoosting technique is learned using the database of positive and negative training examples. At runtime, a novel whole-body volume is scanned and the windows that are classified as positive by the classifier are returned as potential detection results. The detected windows are also ranked based on their responses, and the window with the highest response value has the highest likelihood of being the detected landmark in the novel whole-body volume.

Landmarks detected using the learning-based method are more stable than salient-region features, especially in the presence of structure appearance or disappearance, because these landmarks are pre-defined, and the training process accommodates to some extent the structural variations near these landmarks. The robustness of the detected landmarks can also be guaranteed, and false-positive detections can be eliminated by implementing coarse-to-fine detection, and by exploiting the geometric constraints between the landmarks. In our current study, we manually labeled landmarks in 46 whole-body CT volumes as training data. The volumes are then aligned using weighted alignment, and positive and negative examples are collected and given as input to the Cascaded AdaBoosting learner. At run-time, we achieve an average detection rate of 87% for the 14 landmarks. The detected landmarks can then be used as context features for GCC robust fusion.

VI. Experimental Studies

A. Methods

Figure 2:
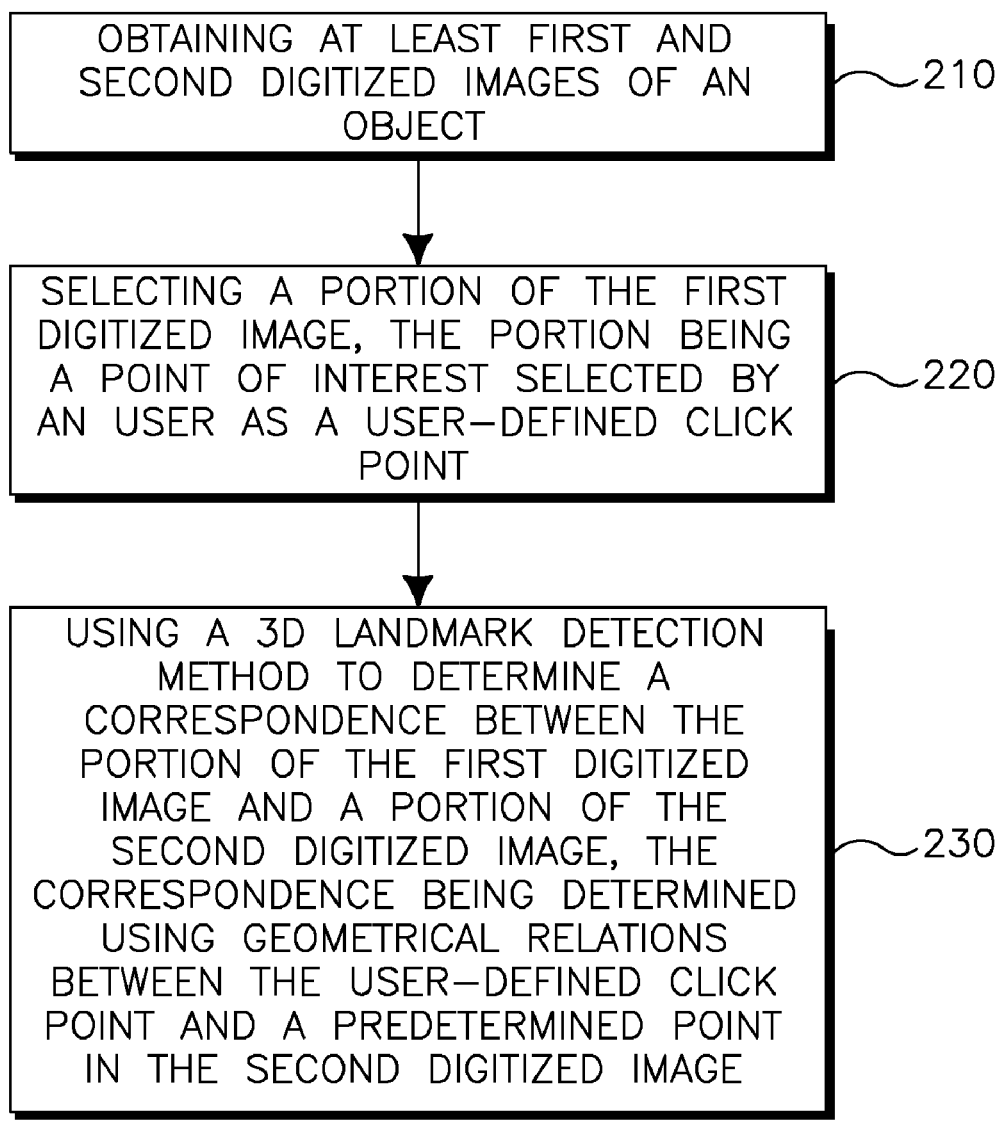
FIG. 2 shows an example flowchart for linking visually dissimilar local regions foa pair of images.

FIG. 2 shows an example flowchart 200 for linking visually dissimilar local regions for a pair of images. A method for linking visually dissimilar local regions of a pair of images is described. A first and second digitized image of an object is obtained (210). A portion of the first digitized image includes a point of interest selected by a user as a user-defined click point (220). The portion of the first digitized image being a location within the first digitized image where a registration accuracy must be higher than registration accuracy in other portions of the first digitized image. A 3D landmark detection method is used to determine a correspondence between a portion of the first digitized image and a portion of the second digitized image (220). The correspondence may be determined using geometrical relations between the user-defined click point in the first digitized image and a predetermined point in the second digitized image.

Figure 3:
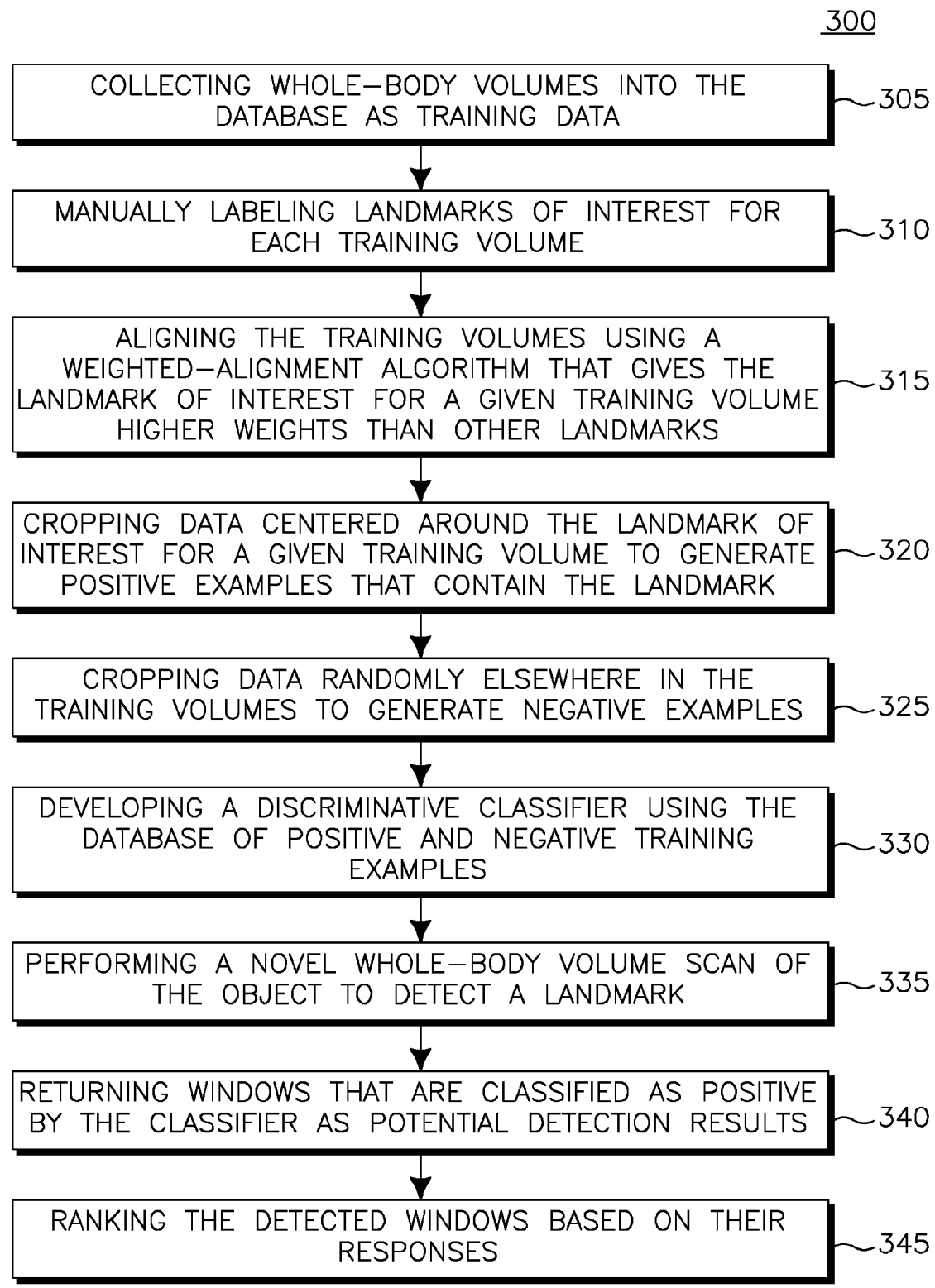
FIG. 3 shows an example flowchart of a 3D landmark detection method.
Figure 4:
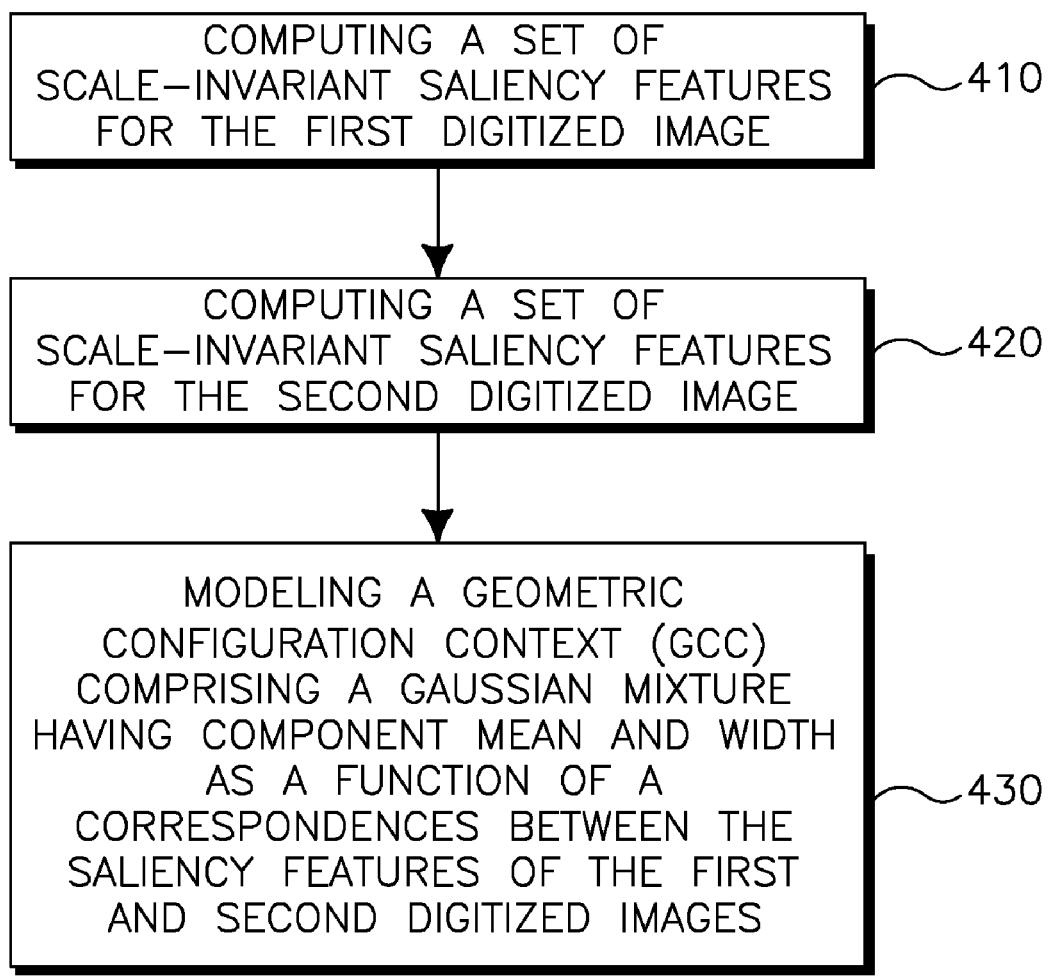
FIG. 4 shows an example flowchart of a saliency region detection method of the 3D landmark detection.

FIG. 3 shows an example flowchart 300 for a 3D landmark detection method. In one embodiment, the 3D landmark detection method is a learning based detection method. The method includes collecting whole-body volumes into a database as training volume (305). Each training volume is manually labeled with landmarks of interest (310). The training volumes are aligned using a weighted-alignment algorithm that gives the landmark of interest for a given training volume higher weights than other landmarks (315). Data centered around the landmark of interest for a given training volume is cropped to generate positive examples that contain the landmark (320). Data randomly elsewhere in the training volumes is cropped to generate negative examples (325). A discriminative classifier is developed using the database of positive and negative training examples (330). A novel whole-body volume scan of the object is performed to detect a landmark (335). Windows are returning that are classified as positive by the classifier as potential detection results (340). The detected windows are ranked based on their responses (345), and the window with the highest response value has the highest likelihood of being the detected landmark in the novel wholebody volume FIG. 4 shows an example flowchart 400 for a saliency region detection method for the 3D landmark detection method. The saliency region detection includes computing a set of scale-invariant saliency features for the first digitized image (410) and computing a set of scale-invariant saliency features for the second digitized image (420). A geometric configuration context (GCC) is modeled comprising a Gaussian mixture having component mean and width as a function of a correspondences between the saliency features of the first and second digitized images (420). The GCC represents the spatial likelihood of a point in the second digitized image corresponding to a user-defined click-point in the first image.

The feasibility of the proposed framework was evaluated by testing the 3D implementation of the above algorithm with a set of 16 whole-body CT volume pairs. Two volumes in each pair were scans taken at different time-points for the same patient. The same scanner protocols were used between each pair. The original volume with a stack of 512-by-512 axial slices were down-sampled to 128-by-128 slices. One of each pair was arbitrary picked to be a reference volume, leaving the other be a floating volume.

The following specific configurations of the proposed algorithms were implemented and tested. For each volume, a number of 50 saliency features were pre-computed: $N_r=N_f=50$. The feature matching algorithm described in Sec. II-C was performed to each pair with 10 nearest reference features to each click-point $c_r$. M=10. Two similarity functions were considered: geometric Euclidean distances and the $X^2$ distance of intensity histograms. Two GCC solutions were tested for: (1) pure translation with K=1 in Sec. II-D, and (2) scaling and translation with K=2 in Sec. IV-A. The Single VBMS method was used to optimize both GCCs as described in Sec. II-E.

For testing, manually-labeled distinctive landmarks, as described in Sec. V, were used. There were 14 landmarks for each person distributed at significant anatomical landmarks, including pelvis, lung, kidneys, and collar bones. For each pair, these 14 points in the reference volume were used as click-points and Euclidean errors were computed between the estimated link $c_f$ and the ground-truth landmarks in the floating domain. This resulted in a total of 224 test cases (16 patients over 14 landmarks). After performing the click-point linking with a GCC, we also considered refining the estimated click-point in the floating domain by using a template matching-based refinement. The size of spherical template was automatically estimated by using maximum entropy criterion (see, e.g., X. Huang, Y. Sun, D. Metaxas, F. Sauer, and C. Xu, "Hybrid image registration based on configural matching of scale-invariant salient region features," in *Second IEEE Workshop on Image and Video Registration, in conjunction with CVPR '04*, 2004.)

A. Results and Discussion

FIG. 1 shows the result of the inventors' experiments. Errors were calculated as Euclidean distances between corresponding ground-truth and estimate in $R^3$. Plots on the left column show the errors as a function of 16 patients averaged over different landmarks. On the other hand, plots on the right show those as a function of 14 landmarks averaged over different patients. For feature correspondence matching, we consider two versions of similarity function. One was the geometric Euclidean distance with the mean bias adjustment and the other was a linear combination of the geometric distance and an appearance-based distance using $X^2$ distance of intensity histograms. The top row show the results for the geometric distance. The total average and median errors were 4.23 and 3.50 voxels, respectively. Next the post-refinement using a template matching with automatic scale selection was performed. The results were shown in the middle row. The average and median errors were 4.39 and 3.24, respectively. Finally, the results with the appearance-based similarity as well as the post-refinement are shown in the bottom row. The average and median errors were 4.68 and 3.10, respectively.]

Overall, the average errors were in the range of 3 to 5 voxels, demonstrating the feasibility of the proposed methods. The results also show that the accuracy depends strongly on patients but not as strong on landmarks. Visual inspection revealed that higher errors (e.g, patient 7 and 14) were caused mainly by the outlier failures due to large amount of mismatching features. The usage of the appearance-based similarity and post-refinement slightly improved the accuracy. However the improvement was small and made outlier errors actually worse so that the mean errors actually became worse. For the inliers, the average errors were smaller than 3 voxels with the post-refinement.

VII. Conclusion

This application discloses a novel framework for robust click-point linking. The click-point linking can be interpreted as a localized registration for estimating a point that corresponds to a given point-of-interest. In order to derive a robust solution for linking visually dissimilar local regions, such as changing tumors, we proposed the Gaussian mixture-based Geometric Configuration Context representing a spatial likelihood of the linking points under classes of domain mapping up to similarity transformation. A variable-bandwidth mean shift-based optimization solution is disclosed for robustly and efficiently find the linking point at a mode of the multi-modal mixture distribution. Our experimental study demonstrated the promise of the proposed approach using hand-labeled whole-body CT data set.

A realization of the disclosed robust click-point linking framework will provide a computer aided diagnostic tool for medical image browsing and analysis with an intuitive graphical visualization, which is faithful to the previously-described typical workflow of radiologists in the longitudinal 3D data studies for cancer therapy monitoring.

A typical medical image/volume browsing system will visualize at least a pair of medical images side-by-side. Such a visualization scheme allows an arbitrary 3D location of the image to be specified by a position indicator (e.g., marker, crosshair) independently across various images. Finally users may be free to explore and browse arbitrary locations of an arbitrary chosen image at any time by using a position locator (e.g., cursor) controlled by a user-controlled device (e.g., mouse and keypad).

The robust click-point linking would provide an automatic way to connect the positioning marker/crosshair across images that are shown on a monitor. When a user activates a specific image and finds a region of interest after browsing, the user can click the location using the mouse-controlled cursor. This will initiate the disclosed linking algorithm which will provide automatic localization of markers in the other images at the corresponding locations, realizing what may be referred to as "sticky markers". With this, users can directly attend and analyze the correspond lesions specified by the linked markers without manual browsing. This improves the workflow of user/radiologists by eliminating the necessity to manually re-browse the other follow-up images to find corresponding regions. These sticky markers facilitate an interactive workflow with a sequence of single mouse-clicks at different locations of interest (i.e., Click-And-Look).

The invention described herein may be automated by, for example, tangibly embodying a program of instructions upon a computer readable storage media, capable of being read by machine capable of executing the instructions. A general purpose computer is one example of such a machine. Examples of appropriate storage media are well known in the art and would include such devices as a readable or writeable CD, flash memory chips (e.g., thumb drive), various magnetic storage media, and the like.

The features of the invention have been disclosed, and further variations will be apparent to persons skilled in the art. All such variations are considered to be within the scope of the appended claims. Reference should be made to the appended claims, rather than the foregoing specification, as indicating the true scope of the subject invention.

What is claimed is:

1. A method for linking visually dissimilar local regions of a pair of images, comprising:
    obtaining at least first and second digitized images of an object;
    using a 3D landmark detection method to determine a correspondence between a portion of the first digitized image and a portion of the second digitized image, the portion of the first digitized image comprises a point of interest selected by a user as a user-defined click point, the portion of the first digitized image being a location within the first digitized image where a registration accuracy must be higher than registration accuracy in other portions of the first digitized image and the correspondence is determined using geometrical relations between the user-defined click point in the first digitized image and a predetermined point in the second digitized image; and
    the 3D landmark detection method is a learning based detection method comprising:
    collecting whole-body volumes into a database as training volumes;
    manually labeling landmarks of interest for each training volume;
    aligning the training volumes using a weighted-alignment algorithm that gives a particular landmark of interest for a given training volume higher weights than other landmarks;
    cropping data centered around the particular landmark of interest for a given training volume to generate positive training examples that contain the particular landmark of interest;
    cropping data randomly elsewhere in the training volumes to generate negative training examples;
    developing a discriminative classifier using the database of positive and negative training examples; and
    performing a novel whole-body volume scan of the object to obtain a novel whole-body volume and detect a landmark in the novel whole-body volume;
    wherein windows that are classified as positive by the classifier are returned as potential detection results, and detected windows are ranked based on their responses, and the detected window with the highest response value has the highest likelihood of being the detected landmark in the novel whole-body volume.

2. The method of claim 1, wherein the first and second digitized images are obtained using one of the following techniques: (a) computed tomography (CT) volumes, (b) magnetic resonance imaging (MRI), or (c) positron emission tomography (PET).

3. A method for linking visually dissimilar local regions of a pair of images, comprising:
    obtaining at least first and second digitized images of an object;
    using a 3D landmark detection method to determine a correspondence between a portion of the first digitized image and a portion of the second digitized image, the portion of the first digitized image comprises a point of interest selected by a user as a user-defined click point, the portion of the first digitized image being a location within the first digitized image where a registration accuracy must be higher than registration accuracy in other portions of the first digitized image and the correspondence is determined using geometrical relations between the user-defined click point in the first digitized image and a predetermined point in the second digitized image; and
    the 3D landmark detection method comprises a saliency region detection method comprising:
    computing a set of scale-invariant saliency features for the first digitized image;
    computing a set of scale-invariant saliency features for the second digitized image; and
    modeling a geometric configuration context (GCC) comprising a Gaussian mixture having component mean and width as a function of a correspondences between the saliency features of the first and second digitized images, wherein the GCC represents the spatial likelihood of a point in the second digitized image corresponding to a user-defined click-point in the first image.

4. The method of claim 3, wherein GCC models are derived for at least one of three transformation classes comprising pure translation, scaling and translation, and similarity transformation.

5. The method of claim 3, wherein said correspondence between at least a portion of the first and second digitized images comprises establishing a point-wise correspondence between first and second points within said first and second digitized images, respectively.

6. The method of claim 5, wherein establishing a point-wise correspondence between first and second points within said first and second digitized images is performed sequentially for different points within the images.

7. A machine readable storage device tangibly embodying a series of instructions executable by the machine to perform a series of steps, the steps comprising:
obtaining at least first and second digitized images of an object;
using a 3D landmark detection method to determine a correspondence between a portion of the first digitized image and a portion of the second digitized image, the wherein the portion of the first digitized image comprises a point of interest selected by a user as a user-defined click point, the portion of the first digitized image being a location within the first digitized image where a registration accuracy must be higher than registration accuracy in other portions of the first digitized image and the correspondence is determined using geometrical relations between the user-defined click point in the first digitized image and a predetermined point in the second digitized image; and
the 3D landmark detection method is a learning based detection method comprising:
collecting whole-body volumes into a database as training volumes;
manually labeling landmarks of interest for each training volume;
aligning the training volumes using a weighted-alignment algorithm that gives a particular landmark of interest for a given training volume higher weights than other landmarks;
cropping data centered around the particular landmark of interest for a given training volume to generate positive training examples that contain the particular landmark of interest;
cropping data randomly elsewhere in the training volumes to generate negative training examples;
developing a discriminative classifier using the database of positive and negative training examples; and
performing a novel whole-body volume scan of the object to obtain a novel whole-body volume and detect a landmark in the novel whole-body volume;
wherein windows that are classified as positive by the classifier are returned as potential detection results, and detected windows are ranked based on their responses, and the detected window with the highest response value has the highest likelihood of being the detected landmark in the novel whole-body volume.

8. A machine readable storage device tangibly embodying a series of instructions executable by the machine to perform a series of steps, the steps comprising:
obtaining at least first and second digitized images of an object;
using a 3D landmark detection method to determine a correspondence between a portion of the first digitized image and a portion of the second digitized image, the wherein the portion of the first digitized image comprises a point of interest selected by a user as a user-defined click point, the portion of the first digitized image being a location within the first digitized image where a registration accuracy must be higher than registration accuracy in other portions of the first digitized image and the correspondence is determined using geometrical relations between the user-defined click point in the first digitized image and a predetermined point in the second digitized image; and
the 3D landmark detection method comprises a saliency region detection method comprising:
computing a set of scale-invariant saliency features for the first digitized image;
computing a set of scale-invariant saliency features for the second digitized image; and
modeling a geometric configuration context (GCC) comprising a Gaussian mixture having component mean and width as a function of a correspondences between the saliency features of the first and second digitized images, wherein the GCC represents the spatial likelihood of a point in the second digitized image corresponding to a user-defined click-point in the first image.

9. The machine readable storage device of claim 8, wherein GCC models are derived for at least one of three transformation classes comprising pure translation, scaling and translation, and similarity transformation.

10. The machine readable storage device of claim 8, wherein said correspondence between at least a portion of the first and second digitized images comprises establishing a point-wise correspondence between first and second points within said first and second digitized images, respectively.

11. The machine readable storage device of claim 10, wherein establishing a point-wise correspondence between first and second points within said first and second digitized images is performed sequentially for different points within the images.

12. The machine readable storage device of claim 8, wherein the first and second digitized images are obtained using one of the following techniques: (a) computed tomography (CT) volumes, (b) magnetic resonance imaging (MRI), or (c) positron emission tomography (PET).

13. A system for registering a pair of medical image data for achieving a high degree of spatial correspondence therebetween, the system comprising:
a scanner configured to obtain at least first and second digitized images of an object;
a memory configured to store data representative of first and second medical images;
a computer configured to employ a 3D landmark detection method to determine a correspondence between a portion of the first digitized image and a portion of the second digitized image, the portion of the first digitized image comprises a point of interest selected by a user as a user-defined click point, the portion of the first digitized image being a location within the first digitized image where a registration accuracy must be higher than registration accuracy in other portions of the first digitized image, and the correspondence is determined using geometrical relations between the user-defined click point in the first digitized image and a predetermined point in the second digitized image; and
the computer is further configured to employ a learning based detection method comprising:
collecting whole-body volumes of the object into a database as training data;
manually labeling landmarks of interest for each training volume;

aligning the training volumes using a weighted-alignment algorithm that gives a particular landmark of interest for a given training volume higher weights than other landmarks;

cropping data centered around the particular landmark of interest for a given training volume to generate positive training examples that contain the particular landmark of interest;

cropping data randomly elsewhere in the training volumes to generate negative training examples;

developing a discriminative classifier using the database of positive and negative training examples; and performing a novel whole-body volume scan of the object to obtain a novel whole-body volume and detect a landmark in the novel whole-body volume;

wherein windows that are classified as positive by the classifier are returned as potential detection results, detected windows are ranked based on their responses, and the detected window with the highest response value has the highest likelihood of being the detected landmark in the novel whole-body volume.

14. The system of claim 13, wherein said correspondence between at least a portion of the first and second digitized images comprises establishing a point-wise correspondence between first and second points within said first and second digitized images, respectively.

15. The system of claim 13, wherein the first and second digitized images are obtained using one of the following techniques: (a) computed tomography (CT) volumes, (b) magnetic resonance imaging (MRI), or (c) positron emission tomography (PET).

16. A system for registering a pair of medical image data for achieving a high degree of spatial correspondence therebetween, the system comprising:

a scanner configured to obtain at least first and second digitized images of an object;

a memory configured to store data representative of first and second medical images;

a computer configured to employ a 3D landmark detection method to determine a correspondence between a portion of the first digitized image and a portion of the second digitized image, the portion of the first digitized image comprises a point of interest selected by a user as a user-defined click point, the portion of the first digitized image being a location within the first digitized image where a registration accuracy must be higher than registration accuracy in other portions of the first digitized image, and the correspondence is determined using geometrical relations between the user-defined click point in the first digitized image and a predetermined point in the second digitized image; and the computer is further configured to use a saliency region detection method comprising:

computing a set of scale-invariant saliency features for the first digitized image;

computing a set of scale-invariant saliency features for the second digitized image; and modeling a geometric configuration context (GCC) comprising a Gaussian mixture having component mean and width as a function of a correspondences between the saliency features of the first and second digitized images, wherein the GCC represents the spatial likelihood of a point in the second digitized image corresponding to a user-defined click-point in the first image.

17. The system of claim 16, wherein GCC models are derived for at least one of three transformation classes comprising pure translation, scaling and translation, and similarity transformation.

* * * * *